US012632103B2

(12) United States Patent
Dai et al.

(10) Patent No.: US 12,632,103 B2
(45) Date of Patent: May 19, 2026

(54) CHIPLET STATE AWARE AND DYNAMIC VOLTAGE REGULATOR EVENT HANDLING

(71) Applicant: Intel Corporation, Santa Clara, CA (US)

(72) Inventors: Jianwei Dai, Portland, OR (US); Yashwitha Suvarna, Union City, CA (US); Boon Hui Ang, Bukit Mertajam (MY); Pranali Shah, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/944,310

(22) Filed: Sep. 14, 2022

(65) Prior Publication Data

US 2024/0085972 A1     Mar. 14, 2024

(51) Int. Cl.
*G06F 1/3296* (2019.01)
*G06F 9/52* (2006.01)

(52) U.S. Cl.
CPC .............. *G06F 1/3296* (2013.01); *G06F 9/52* (2013.01); *G06F 2209/5018* (2013.01); *G06F 2209/5021* (2013.01)

(58) Field of Classification Search
CPC ........... G06F 1/3296; G06F 2209/5018; G06F 2209/5021; G06F 9/52; G06F 1/3243
USPC ........................................................ 713/323
See application file for complete search history.

(56) References Cited

U.S. PATENT DOCUMENTS

| | | | |
|---|---|---|---|
| 6,952,748 B1 * | 10/2005 | Guerrero, Jr. ............. | G06F 1/26 713/300 |
| 2005/0060457 A1 * | 3/2005 | Olukotun .............. | G06F 9/3851 710/240 |
| 2007/0070673 A1 * | 3/2007 | Borkar .................... | H01L 25/16 365/63 |
| 2011/0107344 A1 * | 5/2011 | Kim ...................... | G06F 9/5088 718/105 |
| 2019/0006939 A1 * | 1/2019 | Krishnamurthy ..... | H02M 3/158 |
| 2022/0197367 A1 | 6/2022 | Kirubakaran et al. | |
| 2022/0206862 A1 | 6/2022 | Gupta et al. | |

* cited by examiner

*Primary Examiner* — Chun Cao
(74) *Attorney, Agent, or Firm* — Schwabe, Williamson & Wyatt, P.C.

(57) ABSTRACT

Embodiments described herein may include apparatus, systems, techniques or processes that are directed to chiplet state aware and dynamic prioritization of voltage regulator event indication handling. An intelligent arbiter notifies chiplets of VR events in a dynamic priority scheme that considers multiple factors such as chiplet state (for example, active, sleep, deep sleep, and the like), chiplet power consumption and time frame for transitioning to an active state, outstanding VR requests, chiplet latency sensitivity and the like in its prioritization of chiplet notifications. As chiplet states themselves are dynamic with a chiplet transitioning between multiple states during operation, the intelligent arbiter may also utilize a dynamic prioritization scheme to maximize efficiency and minimize power consumption.

18 Claims, 7 Drawing Sheets

300

600

680$_0$   IF

680$_n$   IF

650

System Agent

PCU   655

Display Controller   652

670   IMC

630

610   610$_0$   Core   LLC   640$_0$

Core   LLC

Core   LLC

610$_n$   Core   LLC   640$_n$

Graphics Engine

620

CHIPLET STATE AWARE AND DYNAMIC VOLTAGE REGULATOR EVENT HANDLING

TECHNICAL FIELD

Embodiments of the present disclosure generally relate to the field of computing, in particular, to the handling of voltage regulator events to improve efficiency and reduce power consumption.

BACKGROUND

Advances in semiconductor processing and logic design have permitted an increase in the amount of circuitry that may be present in a computing system. As system on a chip (SoC) architectures evolve, multiple die (dice) or chiplets may be included on a single SoC. The multiple chiplets may each operate at different and dynamic voltages. Each chiplet may manage their own off SoC voltage regulator(s) (VR) located, for example, on a motherboard. Efficiencies may be introduced that allow sharing of communication channels, such as the communication channels between chiplets on an SOC and voltage regulators on a motherboard. Such sharing may introduce dependencies between chiplets, decreasing efficiency and increasing power consumption. Solutions are needed that reduce these disadvantages.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
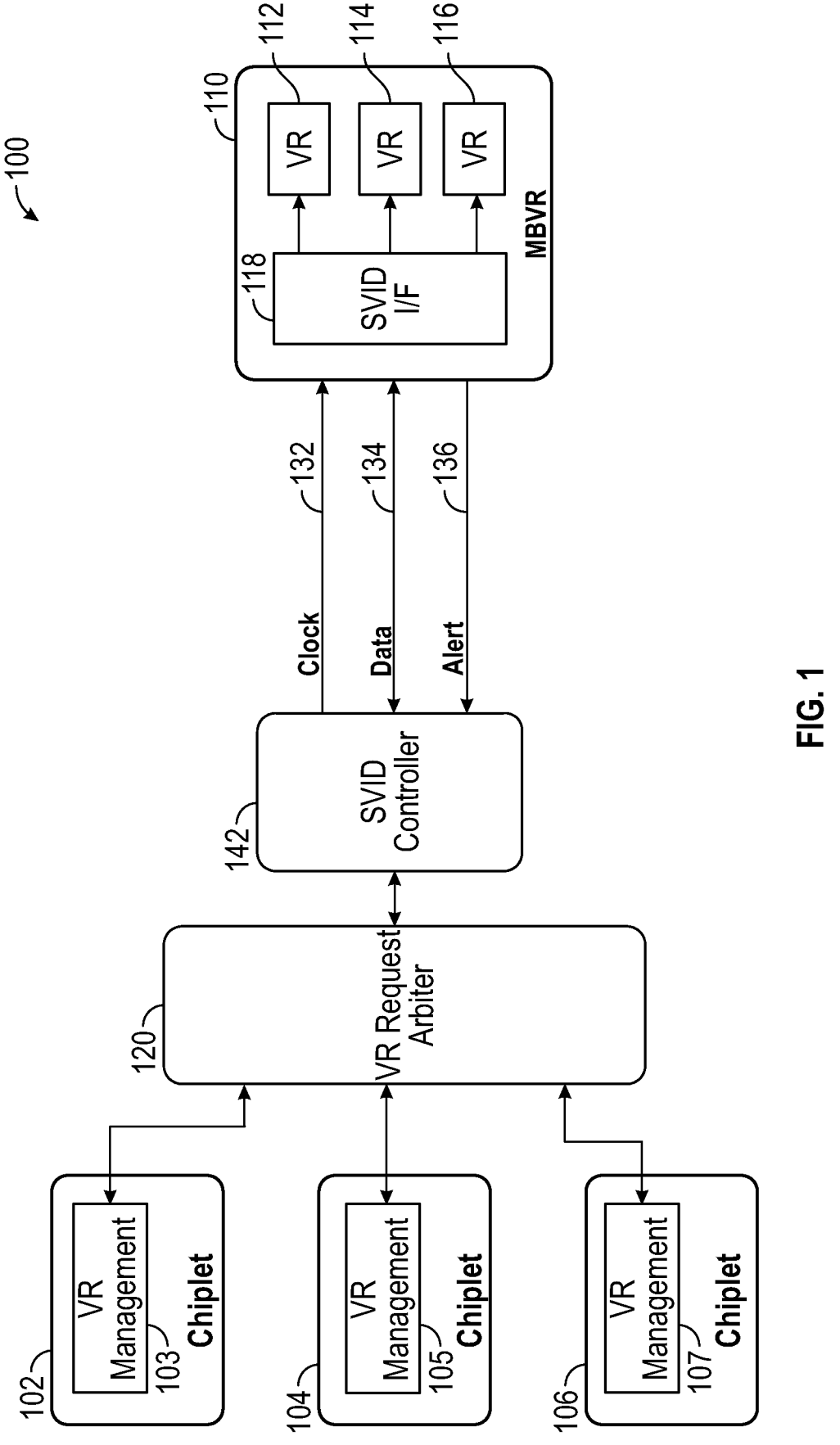
FIG. 1 illustrates a diagram showing a computing system in accordance with various embodiments.

Embodiments described herein may include apparatus, systems, techniques, and/or processes that are directed to chiplet state-aware and dynamic prioritization of voltage regulator event indication handling. An intelligent arbiter notifies chiplets of voltage regulator (VR) events in a dynamic priority scheme that considers multiple factors such as chiplet state (for example, active, sleep, deep sleep, and the like), chiplet power consumption and time needed for transitioning to an active state, outstanding VR requests, chiplet latency sensitivity and the like in its prioritization of chiplet notifications. As chiplet states themselves are dynamic with a chiplet transitioning between multiple states during operation, the intelligent arbiter may also utilize a dynamic prioritization scheme to maximize efficiency and minimize power consumption.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 illustrates a diagram showing a computing system in accordance with various embodiments. Computing system 100 may be any type of computing platform, ranging from small portable devices such as smartphones, tablet computers and so forth to larger devices such as client systems, for example, desktop or workstation systems, server systems and so forth.

Computing system 100 includes multiple chiplets 102, 104, and 106. Examples of chiplets 102, 104 and 106 include, but are not limited to, central processing units (CPUs), graphic processing units (GPUs), various peripheral component interconnect express (PCIe) devices, a phase-locked loop (PLL) unit, an input/output (I/O) unit, an application specific integrated circuit (ASIC) unit, a field-programmable gate array unit, a graphics card, an accelerator, and a three-dimensional integrated circuit (3D IC). Note that chiplets 102, 104 and 106 may include a processor complex which may include one or more cores or processing engines.

Chiplet 102 may operate at a different voltage than that of chiplet 104 and/or chiplet 106. In addition, any of chiplets 102, 104 and 106 may have changes to their voltage during operation based on workload, power efficiency goals, temperature, and the like. Chiplet 102 contains voltage regulator (VR) management circuitry 103 to facilitate voltage changes and send/receive communications with mother board voltage regulator unit (MBVRU) 110. Similarly, chiplets 104 and 106 may contain VR management circuitry 105 and 107 respectively to facilitate voltage changes and send/receive communications with MBVRU 110.

A VR request arbiter 120 manages communication between chiplets 102, 104 and 106 and MBVRU 110. MBVRU 110 includes multiple voltage regulators (VR) 112, 114, and 116. Chiplets 102, 104 and 106 may be associated with one or more of VRs 112, 114, and 116. Chiplets 102, 104 and 106 and VR Request arbiter 120 may be packaged in a single SoC and use an optimized communication channel to communicate to MBVRU 110.

There are various protocols available for communicating with VRs. Some protocols allow VRs to actively notify the SoC of VR events as they occur in order to achieve better response time. As illustrated, a three-wire serial link is used to communicate to MBVRU 110 and includes signal clock 132, data 134 and alert 136. Clock 132 is source synchronous and is driven by serial voltage identification (SVID) controller 142 to a SVID interface 118 on MBVRU 110. Data 134 is a bidirectional serial interface that is used to transfer SVID requests from SVID controller 142 to SVID interface 118 and to send MBVR 110 responses back to SVID controller 142. SVID requests may be generated by one or more of chiplets 102, 104, and 106. Alert 136 is an active low interface signal driven by VRs 112, 114, and 116 to SVID controller 142 to indicate a VR event, that is, a VR change in status, for example, most often indicating that the output voltage has reached the final point in a dynamic voltage change. Alert 136 is shared by all of VRs 112, 114 and 116. Alert 136 is used by VRs 112, 114 and 116 to actively notify chiplets 102, 104 and 106 of VR events. The events may be an indication that the VR has reached a target voltage, a thermal alert, a current or power maximum alert and the like according to some embodiments.

Since the communication channel is shared between multiple chiplets 102, 104, and 106 from multiple VRs 112, 114, and 116, there is a need to have VR request arbiter 120 manage and arbitrate the communications. For example, when alert 136 becomes active, there is no way of knowing which of VRs 112, 114, and 116 generated the alert without querying each of VRs 112, 114 and 116. VR request arbiter 120 notifies chiplets 102, 104 and 106 of a VR event one at a time. Upon notification, for example, chiplet 102 will then query its associated VR(s), one or more of VR 112, 114 and/or 116 to determine if the VR event is relevant to chiplet 102. If the VR event is not relevant to chiplet 102, VR request arbiter 120 will notify another of chiplets 104 and 106 until the intended chiplet is notified. Once the intended chiplet is notified and has acknowledged and/or processed the alert, alert 136 will become deactivated. VR request arbiter 120 continues to rotate through chiplets 102, 104 and 106 until alert 136 is deactivated.

An arbiter typically would query chiplets in a round robin fashion, one at a time, for example, chiplet 102 first, then chiplet 104, followed by chiplet 106. However, such a fashion may be inefficient and may wake chiplets in sleep states unnecessarily causing delay and unnecessary power consumption. In system 100, VR request arbiter 120 takes into account factors such as chiplet state (for example, active, sleep, deep sleep, and the like), chiplet power consumption and time needed for transitioning to an active state, outstanding VR requests and the like in its prioritization of chiplet notifications. As chiplet states themselves are dynamic with a chiplet transitioning between multiple states during operation, VR request arbiter 120 also utilizes a dynamic prioritization scheme to maximize efficiency and minimize power consumption.

Although system 100 is illustrated with three chiplets 102, 104 and 106, fewer or more chiplets may be included in a computing system. Although MBVR 110 is illustrated with three VRs 112, 114 and 116, fewer or more VRs may be included in a computing system. Chiplets 102, 104, and 106, VR request arbiter 120, and SVID controller 142 may be packaged in a single SOC or, alternatively, may be packaged in multiple SOCs. As illustrated, system 100 uses a three-wire channel to communicate between chiplets 102, 104 and 106 and MBVRU 110, however, any such communication channel may be used for such communication.

TABLE 1

```
# Creating priority list among chiplets
for (index=0; index<NUM_OF_CHIPLETS; index++) {
    if (impossible to have a VR event for chiplet[index]) {
        skip chiplet[index] for event handling;
    } else {
        if (chiplet[index] is sleeping)
            low_priority_chiplets[chiplet[index].LOW_PRIORITY_INDEX] = 1;
        else
            high_priority_chiplets[chiplet[index].HIGH_PRIORITY_INDEX] = 1;
}
# when a VR event occurs, let high priority chiplets query their VRs first followed by low
priority chiplets.
if (VR event indication is active)
    for (high_priority_index=0; high_priority_index<NUM_OF_CHIPLETS;
    high_priority_index++) {
```

TABLE 1-continued

```
        if (high_priority_chiplets[high_priority_index] == 1)
            forward VR event indication to the corresponding chiplet associated with the bit
    position high_priority_index.
        else
            don't forward VR event indication to the corresponding chiplet.
    }
    if (VR event indication is still active) {
        for (low_priority_index=0; low_prioritize_index<NUM_OF_CHIPLETS;
    low_priority_index++) {
            if (low_priority_chiplets[low_priority_index] == 1)
                forward VR event indication to the corresponding chiplet associated with
    the bit position low_priority_index.
            else
                don't forward VR event indication to the corresponding chiplet.
            }
            if (VR event indication is still active) {
            Start with high priority list again;
            } else {
              DONE;
              }
        } else {
            DONE;
        }
}
```

Table 1 illustrates pseudo code of a prioritization scheme that may be used by central VR request arbiter 120 in accordance with some embodiments. A chiplet which is active and can receive VR events may be categorized as a high priority chiplet in terms of servicing a VR event indication. According to one embodiment, the scheme uses a high_priority_index vector to represent active chiplets. Each chiplet may have a dedicated bit in the vector. According to another embodiment, the scheme may also have different priorities among the active chiplets, for example, high/medium/low and possibly even more priority levels. This may be used when a given chiplet could benefit by servicing its VR event faster than in a fixed predetermined order. For example, a latency sensitive active chiplet may benefit more by knowing as soon as possible when its voltage request completes, compared to another active chiplet that is latency insensitive. Other factors may be considered when prioritizing active chiplets according to some embodiments.

A chiplet which is in a sleep state may be de-prioritized to service the VR event indication later. According to some embodiments, the illustrated scheme may also introduce prioritization among the chiplets in a sleep state as shown in the pseudo code above by using a low_priority_index vector. There may be various reasons behind this prioritization. For example, if waking up a given chiplet in a sleep state incurs less power penalty compared to servicing other chiplets in sleep states first, then the SOC could choose to handle its VR event indication first. Other factors may be considered when prioritizing chiplets in sleep states according to some embodiments.

According to some embodiments, a chiplet which cannot receive and process a VR event may be skipped from handling VR event indication.

In the second portion of the pseudo code, a VR event is processed. Prioritized VR event handling is performed using the priority lists (high_priority_index/low_priority_index) created in the first portion of the pseudo code. According to some embodiments, the VR event indication may be notified to the chiplets in high_priority_index vector in the order of their bit positions determined in the first portion of the pseudo code. Next, if the VR event indication is still active after going through the high priority chiplets, it may be sent to the low priority chiplets as specified by the low_priority_index vector, again in the order of their bit positions determined in the first portion of the pseudo code. This notification of the chiplets repeats, returning to the high priority chiplets, until the VR event indication is deactivated.

Figure 2:
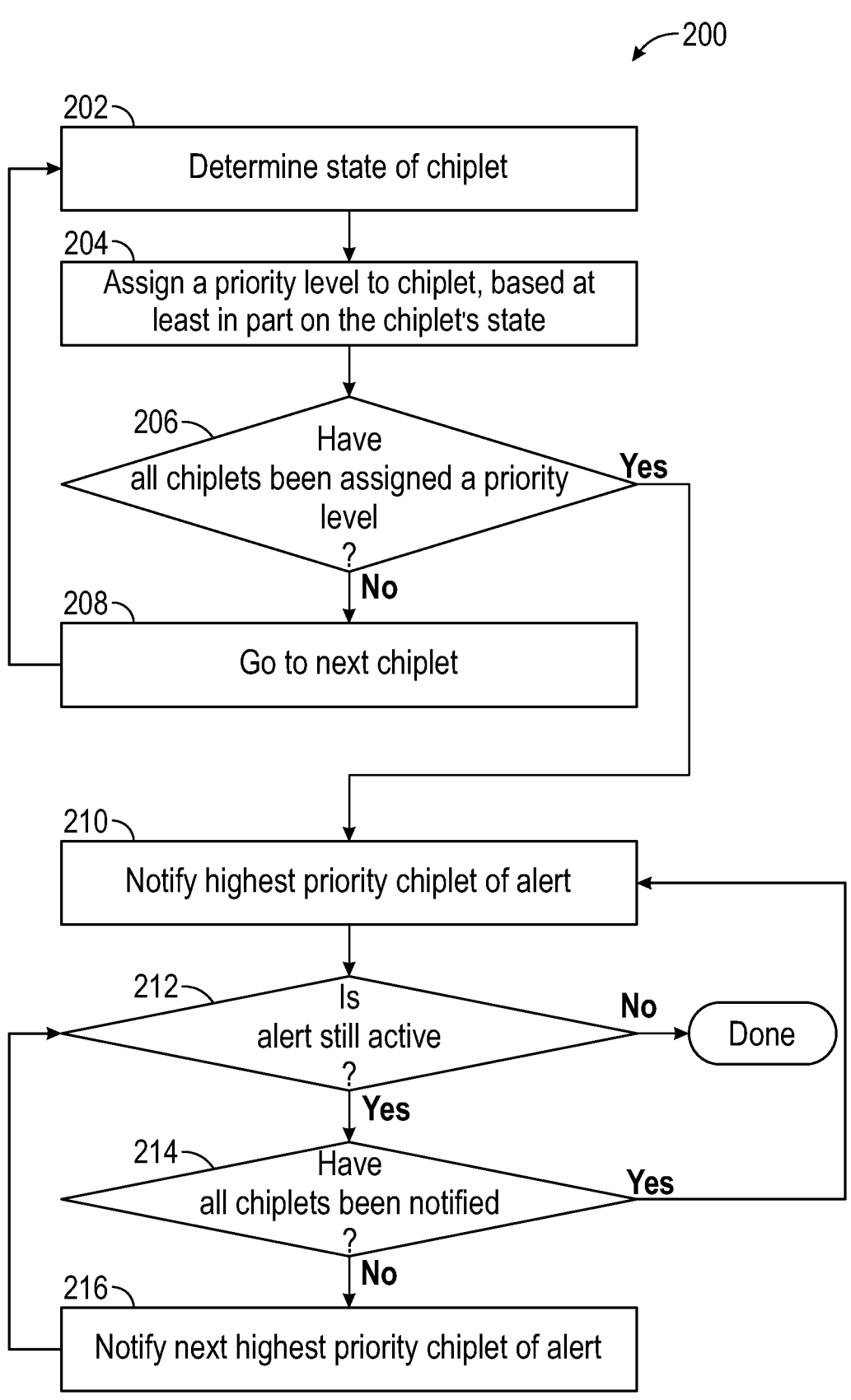
FIG. 2 illustrates a flow diagram in accordance with various embodiments.

FIG. 2 illustrates a flow diagram in accordance with some embodiments. Process 200 begins with determining a state of a chiplet, block 202. The state may be, for example, active, asleep, deep sleep and the like. A chiplet may have any number of potential states. The chiplet is assigned a priority level based, at least in part, on the determined state of the chiplet, block 204. Other factors that may be considered including chiplet power consumption and time necessary for transitioning to an active state, outstanding VR requests, chiplet latency sensitivity, and the like in its prioritization of chiplet notifications. There may be any number of priority levels, including high, medium, and low according to some embodiments. Any number of chiplets may be assigned to a particular priority level, or alternatively, each chiplet may have its own unique assigned priority level. A determination is made whether all chiplets have been assigned a priority level, block 206. If not, the process moves on to the next chiplet, block 208, returning to determining the status of the next chiplet, block 202.

Once all chiplets have been assigned a priority level and a VR event has occurred, the highest priority chiplet is notified of the alert, block 210. The notified chiplet processes the alert, for example, by querying its associated VR(s). Once the chiplet has processed the alert, a determination is made whether the alert is still active, block 212. If the alert is not active, the process is done. If the alert is still active, a determination is made whether all chiplets have been notified, block 214. If not all chiplets have been notified, the next highest priority chiplet is notified of the alert, block 216, then returning to block 212. Blocks 212, 214 and 216 are repeated until all chiplets have been notified and the alert is still active. If all chips have been notified and the alert is still active, the process returns to block 210, notifying the highest priority chiplet of the alert. Note that if any of the chiplets are in a sleep state when it is their turn to be notified, the chiplet must first transition to an active state so that the chiplet can process the alert.

Process 200 may begin with the activation of an alert according to some embodiments. Process 200 may repeat when a chiplet changes state, reassigning priority levels to one or more chiplets, and pausing at block 210 until an alert is active according to some embodiments.

Figure 3:
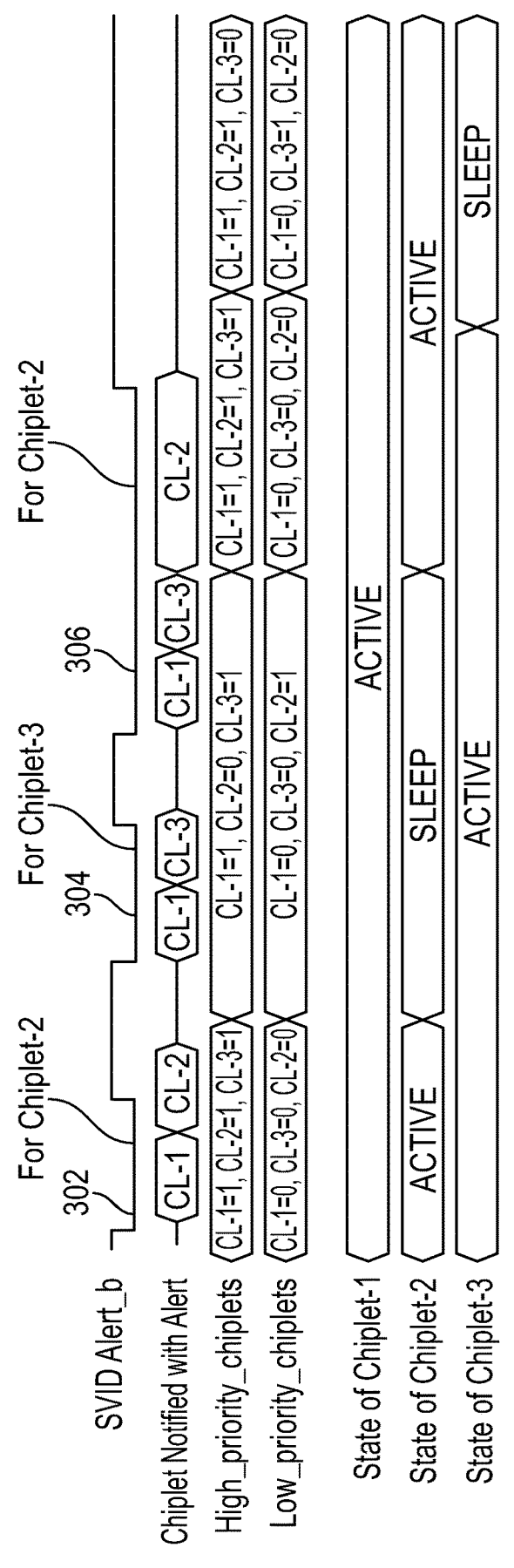
FIG. 3 illustrates a timing diagram of voltage regulator (VR) event handling in accordance with various embodiments.

FIG. 3 illustrates a timing diagram of VR event handling in accordance with some embodiments. As shown, a VR event activation may be serviced in different scenarios avoiding unnecessary wakeup of chiplets in sleep states and achieving better power efficiency. As shown, a first alert event 302 occurs while chiplets 1, 2 and 3 are assigned to a high priority level since all three are in an active state. The arbiter notifies chiplet 1 first, but alert event 302 remains active. The arbiter then notifies chiplet 2 and alert event 302 becomes inactive as alert event 302 is intended for chiplet 2. After being queried by the arbiter, chiplet 2 may communicate with its voltage regulator(s) to process the alert (not shown) and alert event 302 is de-asserted. Chiplet 3 is not notified of alert event 302. As illustrated, chiplet 2 then enters a sleep state and is assigned a low priority level.

Next, alert event 304 is asserted. At this time, only chiplets 1 and 3 are assigned high priority while chiplet 2 is assign low priority. The arbiter notifies first chiplet 1 and next chiplet 3, bypassing chiplet 2 due to its low priority. As alert event 304 is intended for chiplet 3, alert event 304 is de-asserted.

Alert event 306 is then asserted while chiplet 2 remains in a sleep state. The arbitor notifies chiplet 1 followed by chiplet 3 of alert event 306. After these notifications, alert event 306 remains asserted and chiplet 2 is transitioned to an active state to receive the notification of alert event 306. At this time, chiplet 2's prioritization is changed to high due to its active state. Chiplet 2 processes the alert and alert event 306 is de-asserted. At a later time, chiplet 3 enters a sleep state and is assigned a low priority.

Although pseudo code illustrated in Table 1 and the timing diagram illustrated in FIG. 3 shows a simplified prioritization scheme, much more complex prioritization levels are envisioned according to some embodiments. For example, many more sleep states can be utilized according to some embodiments. Additionally, other factors such as power consumption and/or timing considerations can be considered in a prioritization scheme according to some embodiments. For example, if a chiplet consumes a considerable amount of time or power to transition states, it may be given a lower priority than other chiplets. The scheme may also include other factors such as whether the chiplet recently sent a voltage ramp request and is awaiting a response from its VR or a chiplet's amount of time in a sleep state (a chiplet in a prolonged sleep state may be less likely to have a VR alert and be given a lower priority) according to some embodiments.

Although embodiments are described with reference to particular implementations, embodiments are not limited in this regard. In particular, it is contemplated that similar techniques and teachings of embodiments described herein may be applied to other types of circuits, semiconductor devices, processors, systems, etc. For example, the disclosed embodiments may be implemented in any type of computer system, including server computers (e.g., tower, rack, blade, micro-server and so forth), communications systems, storage systems, desktop computers of any configuration, laptop, notebook, and tablet computers (including 2:1 tablets, phablets and so forth). In addition, disclosed embodiments can also be used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. Further, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth.

Figure 4:
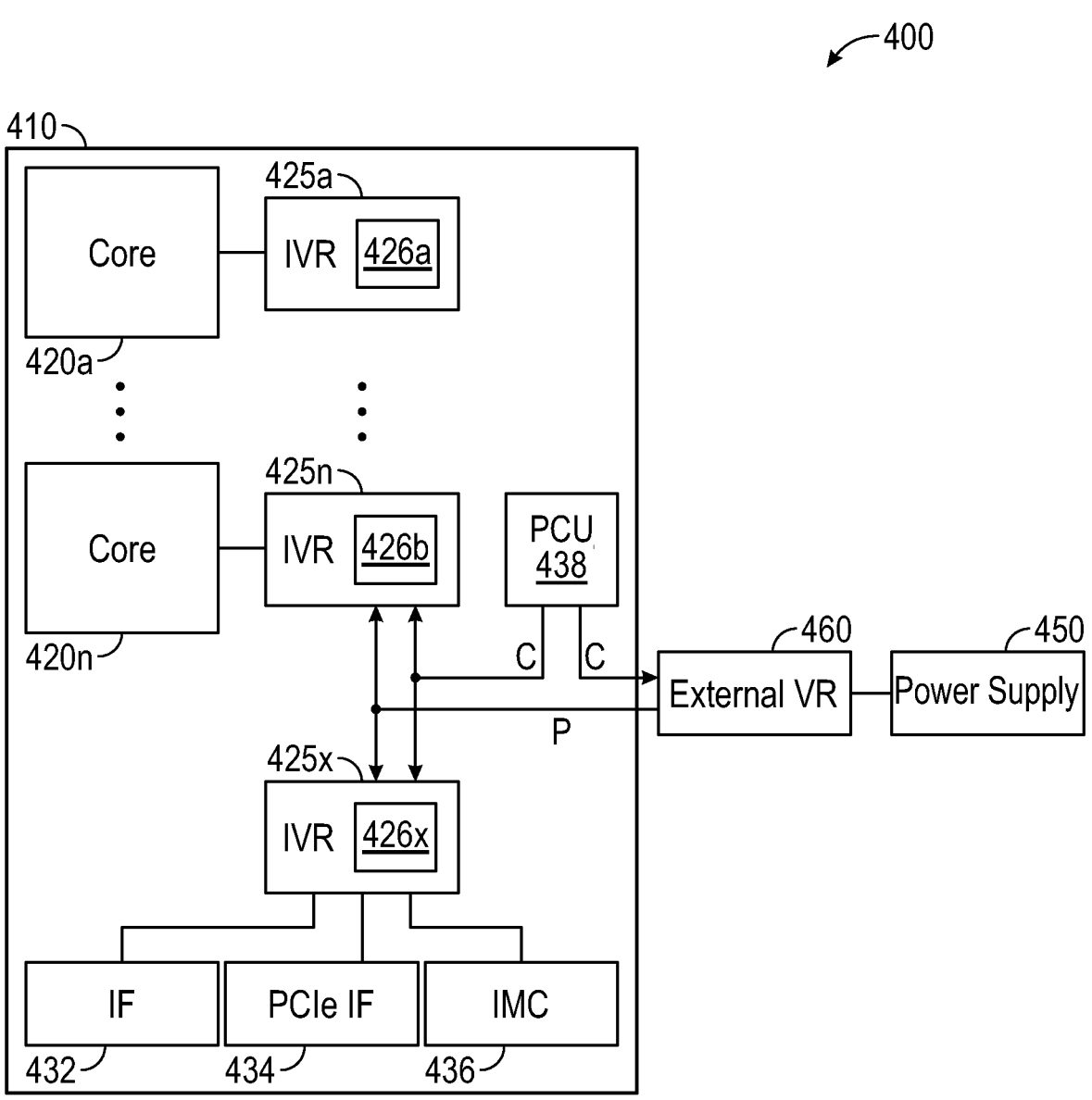
FIG. 4 illustrates a block diagram of a portion of a system in accordance with some embodiments.

Referring now to FIG. 4, shown is a block diagram of a portion of a system in accordance with some embodiments. A system 400 may include various components, including a processor 410 which as shown is a multicore processor. Processor 410 may be coupled to a power supply 450 via an external voltage regulator 460, which may perform a first voltage conversion to provide a primary regulated voltage Vreg to processor 410.

As seen, processor 410 may be a single die processor including multiple cores 420a-420n. In addition, each core may be associated with an integrated voltage regulator (IVR) 425a-425n which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered. Similarly, cores 420 may include or be associated with independent clock generation circuitry such as one or more phase lock loops (PLLs) to control operating frequency of each core 420 independently.

According to various embodiments, cores 420 may be any size and type of computing core, for example, large computing system or small microcontroller, graphics processing unit (GPU), neural network, video processing core, matrix core and the like.

Still referring to FIG. 4, additional components may be present within the processor including an input/output interface (IF) 432, another interface 434, and an integrated memory controller (IMC) 436. As seen, each of these components may be powered by another integrated voltage regulator 425x. In one embodiment, interface 432 may enable operation for an Intel® Quick Path Interconnect (QPI) interconnect, which provides for point-to-point (PtP) links in a cache coherent protocol that includes multiple layers including a physical layer, a link layer and a protocol layer. In turn, interface 434 may communicate via a Peripheral Component Interconnect Express (PCIe™) protocol.

Also shown is a power control unit (PCU) 438, which may include circuitry including hardware, software and/or firmware to perform power management operations with regard to processor 410. As seen, PCU 438 provides control information to external voltage regulator 460 to cause the voltage regulator to generate the appropriate regulated voltage. PCU 438 also provides control information to IVRs 425 to control the operating voltage generated (or to cause a corresponding IVR to be disabled in a low power mode). In various embodiments, PCU 438 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

In FIG. 4, PCU 438 is illustrated as being present as a separate logic of the processor. In other cases, PCU 438 may execute on a given one or more of cores 420. In some cases, PCU 438 may be implemented as a microcontroller (dedicated or general-purpose) or other control logic configured to execute its own dedicated power management code, sometimes referred to as P-code. In yet other embodiments, power management operations to be performed by PCU 438 may be implemented externally to a processor, such as by way of a separate power management integrated circuit (PMIC) or another component external to the processor. In yet other embodiments, power management operations to be performed by PCU 438 may be implemented within BIOS or other system software.

Embodiments may be particularly suitable for a multicore processor in which each of multiple cores can operate at an independent voltage and frequency point. As used herein the term "domain" is used to mean a collection of hardware and/or logic that operates at the same voltage and frequency point. In addition, a multicore processor can further include other non-core processing engines such as fixed function units, graphics engines, and so forth. Such processor can include independent domains other than the cores, such as one or more domains associated with a graphics engine (referred to herein as a graphics domain) and one or more domains associated with non-core circuitry, referred to herein as a system agent. Although many implementations of a multi-domain processor can be formed on a single semiconductor die, other implementations can be realized by a multi-chip package in which different domains can be present on different semiconductor die of a single package.

While not shown for ease of illustration, understand that additional components may be present within processor 410 such as non-core logic, and other components such as internal memories, e.g., one or more levels of a cache memory hierarchy and so forth. Furthermore, while shown in the implementation of FIG. 4 with an integrated voltage regulator, embodiments are not so limited. For example, other regulated voltages may be provided to on-chip resources from external voltage regulator 460 or one or more additional external sources of regulated voltages.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic, overclocking, or turbo mode state in which, when power and/or thermal budget is available, processor hardware can configure the processor or at least portions thereof to operate at a higher than guaranteed frequency. In many implementations, a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, CA, to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another example power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle.

Power management techniques also may be used when constraints exist in an operating environment. For example, when a power and/or thermal constraint is encountered, power may be reduced by reducing operating frequency and/or voltage. Other power management techniques include throttling instruction execution rate or limiting scheduling of instructions. Still further, it is possible for instructions of a given instruction set architecture to include express or implicit direction as to power management operations. Although described with these particular examples, understand that many other power management techniques may be used in particular embodiments.

Figure 5:
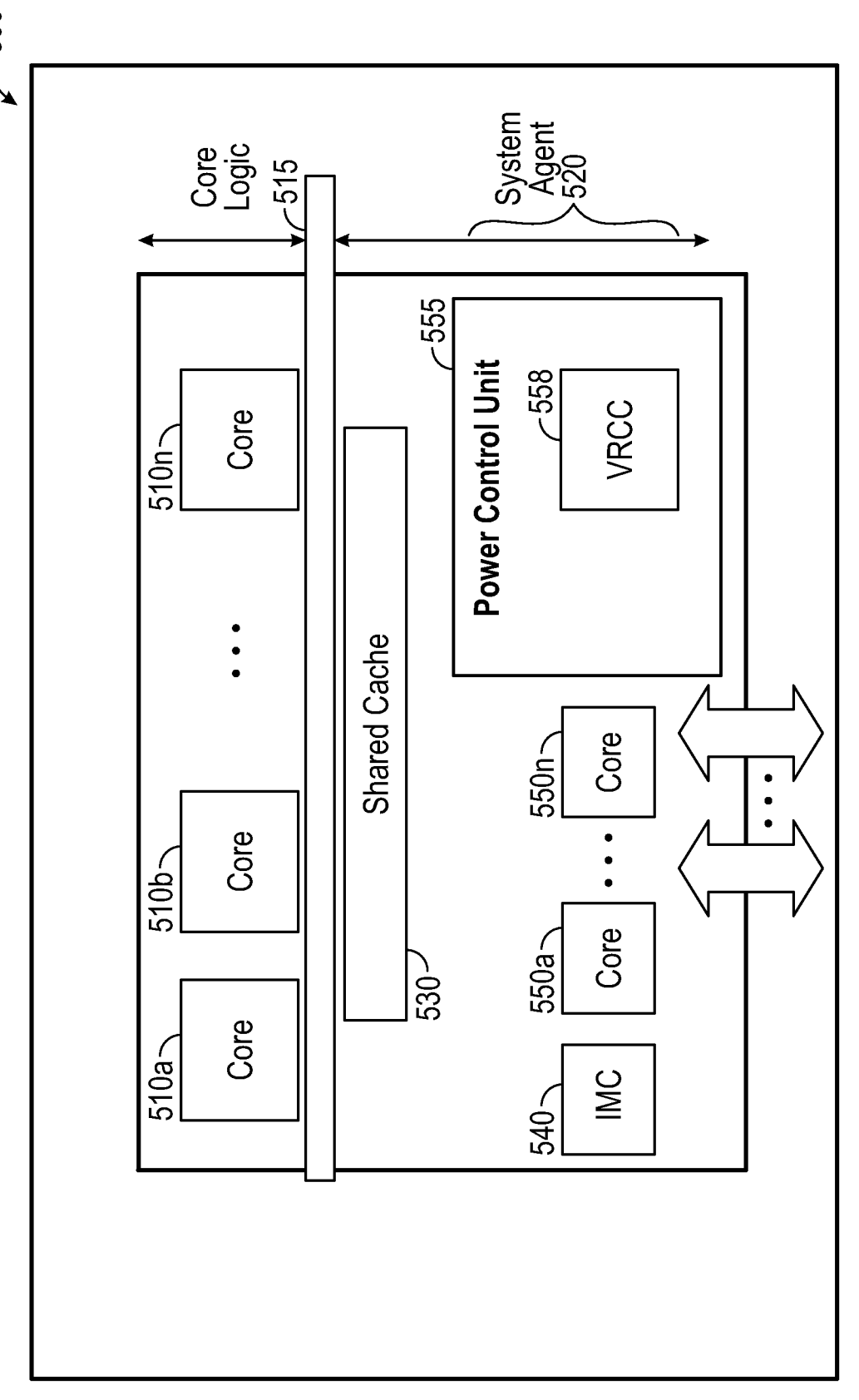
FIG. 5 illustrates a block diagram of a processor in accordance with an embodiment.

Embodiments can be implemented in processors for various markets including server processors, desktop processors, mobile processors and so forth. Referring now to FIG. 5, shown is a block diagram of a processor in accordance with an embodiment. As shown, processor 500 may be a multicore processor including a plurality of cores 510*a*-510*n*. In one embodiment, each such core may be of an independent power domain and can be configured to enter and exit active states and/or maximum performance states based on workload. One or more cores 510 may be heterogeneous to the other cores, e.g., having different microarchitectures, instruction set architectures, pipeline depths, power and performance capabilities. The various cores may be coupled via an interconnect 515 to a system agent 520 that includes various components. As seen, the system agent 520 may include a shared cache 530 which may be a last level cache. In addition, the system agent may include an integrated memory controller 540 to communicate with a system memory (not shown in FIG. 5), e.g., via a memory bus. The system agent 520 also includes various interfaces 550 and a power control unit 555, which may include logic to perform the power management techniques described herein.

In addition, by interfaces 550a-550n, connection can be made to various off-chip components such as peripheral devices, mass storage and so forth. While shown with this particular implementation in the embodiment of FIG. 5, alternative embodiments may be envisioned.

Figure 6:
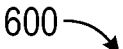
FIG. 6 illustrates a block diagram of a multi-domain processor in accordance with another embodiment.

Referring now to FIG. 6, shown is a block diagram of a multi-domain processor in accordance with another embodiment. As shown, processor 600 includes multiple domains. Specifically, a core domain 610 can include a plurality of cores 610a-610n, a graphics domain 620 can include one or more graphics engines, and a system agent domain 650 may further be present. In some embodiments, system agent domain 650 may execute at an independent frequency than the core domain and may remain powered on at all times to handle power control events and power management such that domains 610 and 620 can be controlled to dynamically enter into and exit high power and low power states. Each of domains 610 and 620 may operate at different voltage and/or power. Note that while only shown with three domains, understand the scope is not limited in this regard and additional domains can be present in other embodiments. For example, multiple core domains may be present each including at least one core.

In general, each of the cores 610a-610n may further include low level caches in addition to various execution units and additional processing elements. In turn, the various cores may be coupled to each other and to a shared cache memory formed of a plurality of units of a last level cache (LLC) 640a-640n. In various embodiments, LLC 640 may be shared amongst the cores and the graphics engine, as well as various media processing circuitry. As seen, a ring interconnect 630 thus couples the cores together, and provides interconnection between the cores, graphics domain 620 and system agent domain 650. In one embodiment, interconnect 630 can be part of the core domain. However, in other embodiments the ring interconnect can be of its own domain.

As further seen, system agent domain 650 may include display controller 652 which may provide control of and an interface to an associated display. As further seen, system agent domain 650 may include a power control unit 655 which can include logic to perform the power management techniques described herein.

Processor 600 may further include an integrated memory controller (IMC) 670 that can provide for an interface to a system memory, such as a dynamic random access memory (DRAM). Multiple interfaces 680a-680n may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 6, understand alternate embodiments may be envisioned.

Figure 7:
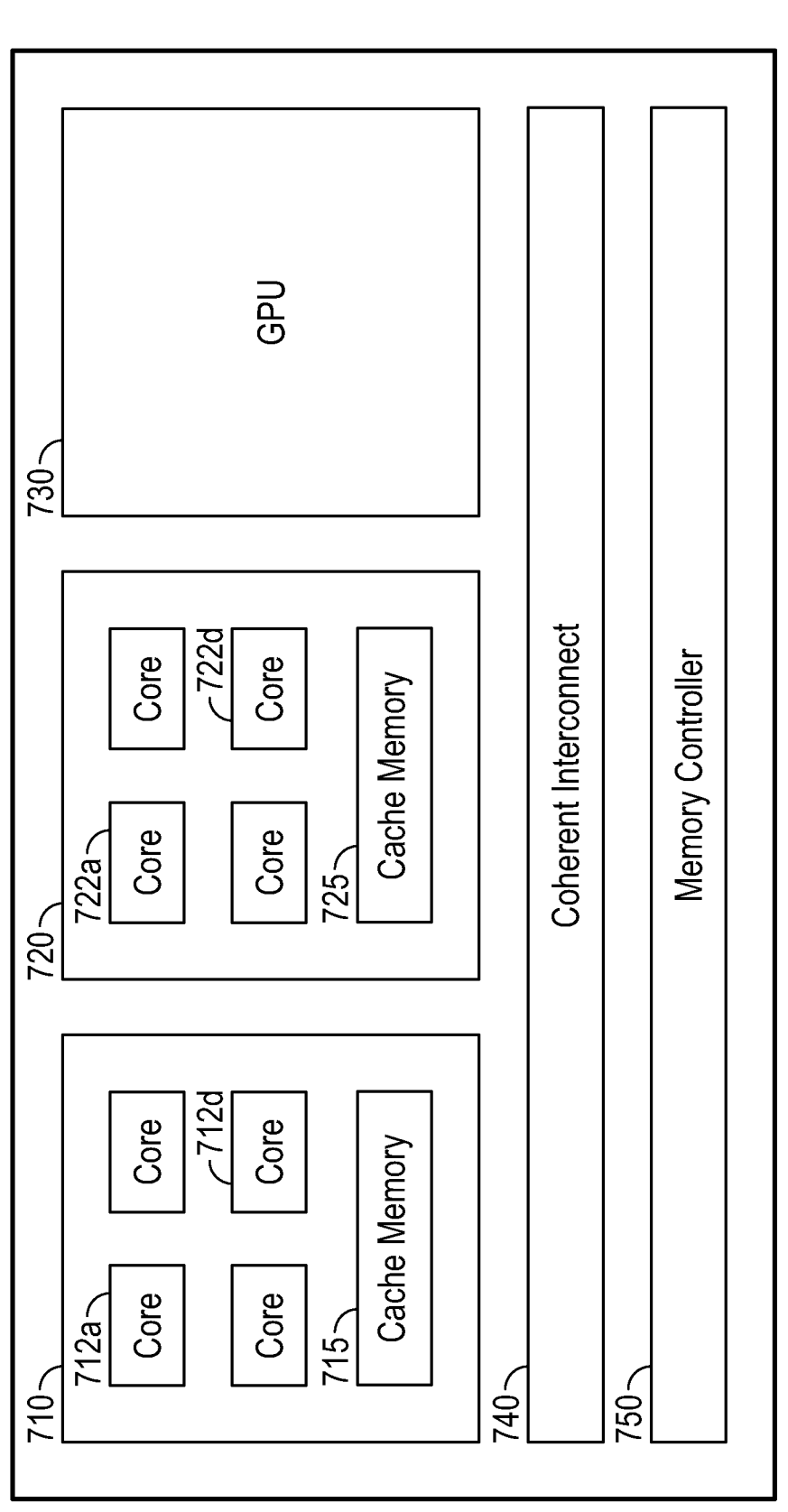
FIG. 7 illustrates a block diagram of a representative SoC in accordance with an embodiment.

Referring now to FIG. 7, shown is a block diagram of a representative SoC in accordance with an embodiment. In the embodiment shown, SoC 700 may be a multi-core SoC configured for low power operation to be optimized for incorporation into a smartphone or other low power device such as a tablet computer or other portable computing device. As an example, SoC 700 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 7, SoC 700 includes a first core domain 710 having a plurality of first cores 712a-712d. In an example, these cores may be low power cores such as in-order cores. In one embodiment, these first cores may be implemented as ARM Cortex A53 cores. In turn, these cores couple to a cache memory 715 of core domain 710. In addition, SoC 700 includes a second core domain 720. In the illustration of FIG. 7, second core domain 720 has a plurality of second cores 722a-722d. In an example, these cores may be higher power-consuming cores than first cores 712. In an embodiment, the second cores may be out-of-order cores, which may be implemented as ARM Cortex A57 cores. In turn, these cores couple to a cache memory 725 of core domain 720. Note that while the example shown in FIG. 7 includes 4 cores in each domain, understand that more or fewer cores may be present in a given domain in other examples.

With further reference to FIG. 7, a graphics domain 730 also is provided, which may include one or more graphics processing units (GPUs) configured to independently execute graphics workloads, e.g., provided by one or more cores of core domains 710 and 720. As an example, GPU domain 730 may be used to provide display support for a variety of screen sizes, in addition to providing graphics and display rendering operations.

As seen, the various domains couple to a coherent interconnect 740, which in an embodiment may be a cache coherent interconnect fabric that in turn couples to an integrated memory controller 750. Coherent interconnect 740 may include a shared cache memory, such as an L3 cache, in some examples. In an embodiment, memory controller 750 may be a direct memory controller to provide for multiple channels of communication with an off-chip memory, such as multiple channels of a DRAM (not shown for ease of illustration).

In different examples, the number of the core domains may vary. For example, for a low power SoC suitable for incorporation into a mobile computing device, a limited number of core domains such as shown in FIG. 7 may be present. Still further, in such low power SoCs, core domain 720 including higher power cores may have fewer numbers of such cores. For example, in one implementation two cores 722 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope is to be determined entirely by the following claims, which are to be construed in accordance with established doctrines of claim interpretation.

Examples

The following examples pertain to further embodiments.

An example may be an apparatus comprising a chiplet; and a voltage regulator (VR) request arbiter coupled to the chiplet, the VR request arbiter to determine a state level of the chiplet and assign a priority level to the chiplet based on the state level of the chiplet, the VR request arbiter further to notify the chiplet of a VR event in an order according to the priority level assigned to the chiplet.

Another example may include wherein the priority level assigned is high if the chiplet is in an active state and low if the chiplet is in a sleep state.

Another example may include the priority level is further based on one of an amount of power the chiplet requires to transition to an active state, an amount of time the chiplet requires to transition to an active state, a current outstanding VR request from the chiplet, and a latency sensitivity of the chiplet.

Another example may include the VR request arbiter further to cause the chiplet to transition to an active state to notify the chiplet of the VR event when the chiplet is in a sleep state.

Another example may include wherein the VR event is one of an indication that a voltage has reached a target voltage, a thermal alert, a current maximum alert, and a power maximum alert.

Another example may include wherein the chiplet comprises voltage regulator management circuitry.

Another example may include wherein the VR management circuitry to send a request to a voltage regulator to change a voltage of the chiplet during operation of the chiplet.

Another example may a system comprising a first chiplet; a second chiplet; a first voltage regulator to supply voltage to the first chiplet; a second voltage regulator to supply voltage to the second chiplet; and a voltage regulator (VR) request arbiter coupled to the first chiplet, the second chiplet, the first voltage regulator and the second voltage regulator, the VR request arbiter to determine a first state level of the first chiplet and assign a first priority level to the first chiplet based on the first state level of the first chiplet, the VR request arbiter to determine a second state level of the second chiplet and assign a second priority level to the second chiplet based on the second state level of the second chiplet, the VR request arbiter further to notify the first chiplet and the second chiplet of a VR event in an order according to the first priority level assigned to the first chiplet and the second priority level assigned to the second chiplet.

Another example may include wherein the first priority level assigned is high if the first chiplet is in an active state and low if the first chiplet is in a sleep state.

Another example may include wherein the first priority level is further based on one of an amount of power the first chiplet requires to transition to an active state, an amount of time the first chiplet requires to transition to the active state, a current outstanding VR request from the first chiplet, and a latency sensitivity of the first chiplet.

Another example may include the VR request arbiter further to cause the first chiplet to transition to an active state to notify the first chiplet of the VR event.

Another example may include wherein the VR event is one of an indication from the first voltage regulator that a voltage has reached a target voltage, a thermal alert, a current maximum alert, and a power maximum alert.

Another example may include wherein the first chiplet comprises voltage regulator management circuitry.

Another example may include wherein the VR management circuitry to send a request to the first voltage regulator to change a voltage of the first chiplet during operation of the first chiplet.

Another example may be a method comprising determining a state of a chiplet; assigning a priority value to the chiplet, the priority level based on the state of the chiplet; and notifying the chiplet of a VR event, the timing of the notifying based on the priority level assigned to the chiplet.

Another example may include wherein the priority level assigned is high if the chiplet is in an active state and low if the chiplet is in a sleep state.

Another example may include wherein the priority level is further based on one of an amount of power the chiplet requires to transition to an active state, an amount of time the chiplet requires to transition to an active state, a current outstanding VR request from the chiplet, and a latency sensitivity of the chiplet.

Another example may include causing the chiplet to transition to an active state before notifying the chiplet of the VR event.

Another example may include wherein the VR event is one of an indication that a voltage has reached a target voltage, a thermal alert, a current maximum alert, and a power maximum alert.

Another example may include sending a request to a voltage regulator to change a voltage of the chiplet during operation of the chiplet.

Another example may include an apparatus comprising means to perform one or more elements of a method described in or related to any of examples herein, or any other method or process described herein.

Another example may include one or more non-transitory computer-readable media comprising instructions to cause an electronic device, upon execution of the instructions by one or more processors of the electronic device, to perform one or more elements of a method described in or related to any of examples herein, or any other method or process described herein.

Another example may include an apparatus comprising logic, modules, or circuitry to perform one or more elements of a method described in or related to any of examples herein, or any other method or process described herein.

Another example may include a method, technique, or process as described in or related to any of examples herein, or portions or parts thereof.

Another example may include an apparatus comprising: one or more processors and one or more computer readable media comprising instructions that, when executed by the one or more processors, cause the one or more processors to perform the method, techniques, or process as described in or related to any of examples herein, or portions thereof.

Another example may include a signal as described in or related to any of examples herein, or portions or parts thereof.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EE-PROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus, comprising:
a chiplet; and
a voltage regulator (VR) request arbiter coupled to the chiplet, the VR request arbiter to determine a state level of the chiplet and assign a priority level to the chiplet based on the state level of the chiplet, the VR request arbiter further to notify the chiplet of a VR event in an order according to the priority level assigned to the chiplet, and the VR request arbiter further to cause the chiplet to transition to an active state to notify the chiplet of the VR event when the chiplet is in a sleep state.

2. The apparatus of claim 1, wherein the priority level assigned is high if the chiplet is in an active state and low if the chiplet is in a sleep state.

3. The apparatus of claim 1, wherein the priority level is further based on one of an amount of power the chiplet requires to transition to an active state, an amount of time the chiplet requires to transition to an active state, a current outstanding VR request from the chiplet, and a latency sensitivity of the chiplet.

4. The apparatus of claim 1, wherein the VR event is one of an indication that a voltage has reached a target voltage, a thermal alert, a current maximum alert, and a power maximum alert.

5. The apparatus of claim 1, wherein the chiplet comprises VR management circuitry.

6. The apparatus of claim 5, wherein the VR management circuitry to send a request to a voltage regulator to change a voltage of the chiplet during operation of the chiplet.

7. A system comprising:
a first chiplet;
a second chiplet;
a first voltage regulator to supply voltage to the first chiplet;
a second voltage regulator to supply voltage to the second chiplet; and
a voltage regulator (VR) request arbiter coupled to the first chiplet, the second chiplet, the first voltage regulator and the second voltage regulator, the VR request arbiter to determine a first state level of the first chiplet and assign a first priority level to the first chiplet based on the first state level of the first chiplet, the VR request arbiter to determine a second state level of the second chiplet and assign a second priority level to the second chiplet based on the second state level of the second chiplet, the VR request arbiter further to notify the first chiplet and the second chiplet of a VR event in an order according to the first priority level assigned to the first chiplet and the second priority level assigned to the second chiplet.

8. The system of claim 7, wherein the first priority level assigned is high if the first chiplet is in an active state and low if the first chiplet is in a sleep state.

9. The system of claim 7, wherein the first priority level is further based on one of an amount of power the first chiplet requires to transition to an active state, an amount of time the first chiplet requires to transition to the active state, a current outstanding VR request from the first chiplet, and a latency sensitivity of the first chiplet.

10. The system of claim 7, the VR request arbiter further to cause the first chiplet to transition to an active state to notify the first chiplet of the VR event.

11. The system of claim 7, wherein the VR event is one of an indication from the first voltage regulator that a voltage has reached a target voltage, a thermal alert, a current maximum alert, and a power maximum alert.

12. The system of claim 7, wherein the first chiplet comprises VR management circuitry.

13. The system of claim 12, wherein the VR management circuitry to send a request to the first voltage regulator to change a voltage of the first chiplet during operation of the first chiplet.

14. A non-transitory computer-readable media, comprising instructions configured to cause one or more processors, upon execution of the instructions to:

determine a state of a chiplet;

assign a priority level to the chiplet, the priority level based on the state of the chiplet;

notify the chiplet of a voltage regulator (VR) event, a timing of the notifying based on the priority level assigned to the chiplet; and cause the chiplet to transition to an active state before notifying the chiplet of the VR event.

15. The non-transitory computer-readable media of claim 14, wherein the priority level assigned is high if the chiplet is in an active state and low if the chiplet is in a sleep state.

16. The non-transitory computer-readable media of claim 14, wherein the priority level is further based on one of an amount of power the chiplet requires to transition to an active state, an amount of time the chiplet requires to transition to an active state, a current outstanding VR request from the chiplet, and a latency sensitivity of the chiplet.

17. The non-transitory computer-readable media of claim 14, wherein the VR event an indication that a voltage has reached at least one of a target voltage, a thermal alert, a current maximum alert, or a power maximum alert.

18. The non-transitory computer-readable media of claim 14, wherein the one or more processors, upon execution of the instructions, are configured to send a request to a voltage regulator to change a voltage of the chiplet during operation of the chiplet.

* * * * *